April 21, 1942.　　　J. H. WILSON　　　2,280,140
FUEL SUPPLY MEANS FOR POWER PLANTS
Filed Nov. 28, 1939
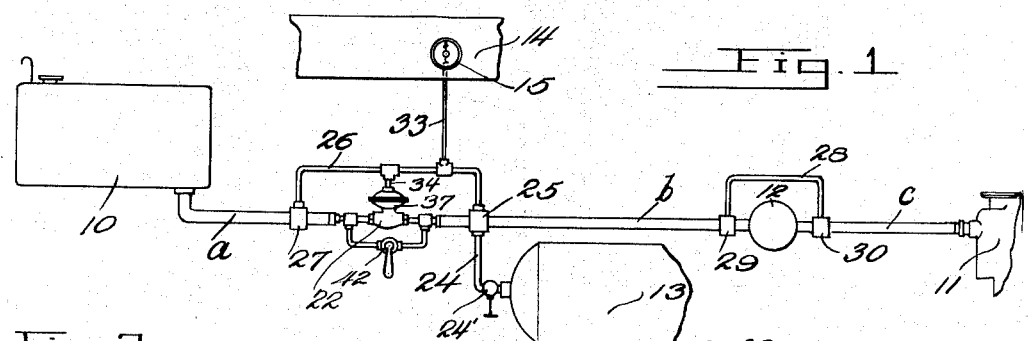
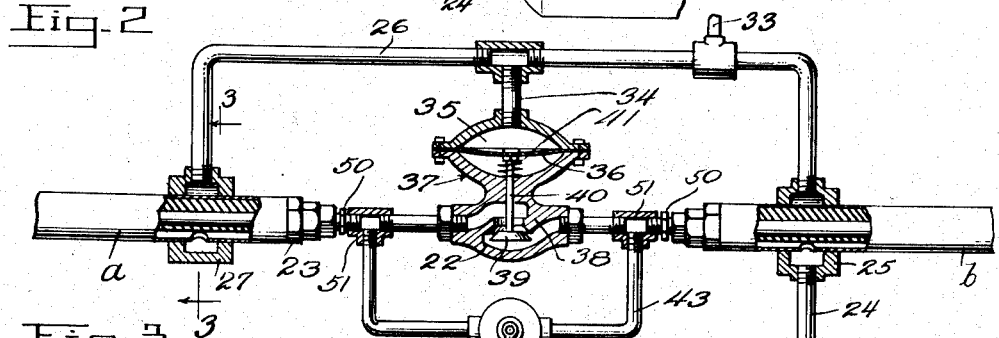
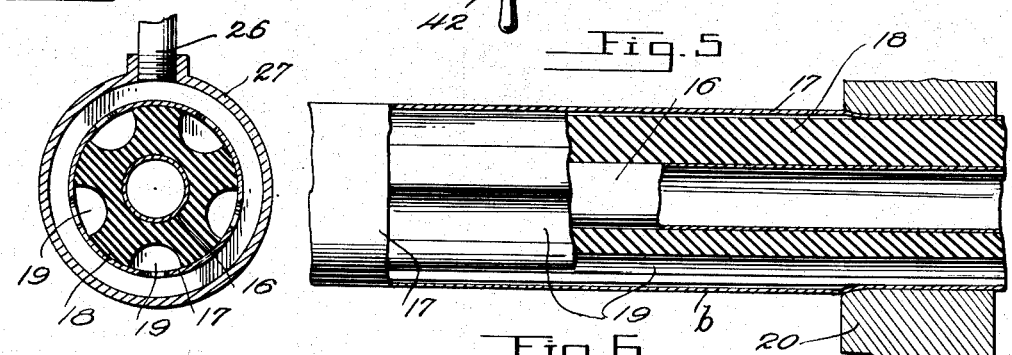
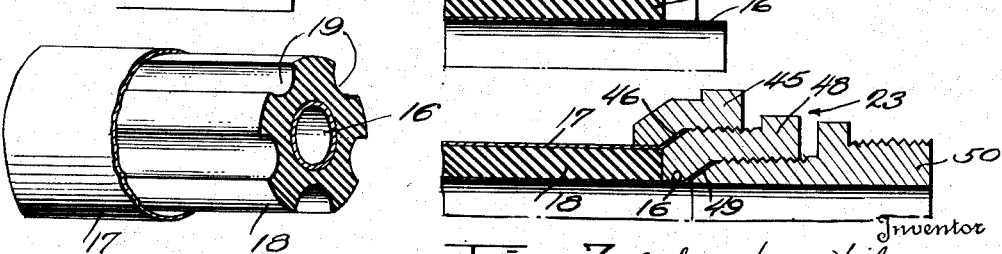
Inventor
John Hart Wilson
By Watson, Cole, Grindle & Watson
Attorneys Patented Apr. 21, 1942

2,280,140

UNITED STATES PATENT OFFICE 2,280,140

FUEL SUPPLY MEANS FOR POWER PLANTS

John Hart Wilson, Wichita Falls, Tex.

Application November 28, 1939, Serial No. 306,581

4 Claims. (Cl. 158—42.1)

The present invention relates to fuel supply systems for power plants and particularly to fuel lines for conveying fuel from the fuel storage tank of an airplane to a carbureting device.

It is, of course, well-known that the lines or conduits for supplying fuel and lubricating oils to the engines of aircraft are subjected to intense vibration when the aircraft is in motion. Because of such vibration the fuel and oil lines have developed leaks due to cracking, or have become entirely broken on numerous occasions, thus permitting fuel such as gasoline or lubricating oil to escape, immediately creating a most dangerous fire hazard. Various attempts have been made to safeguard fuel and oil supply conduits and to reduce the dangers of leakage but, despite such prior suggestions, and actual attempts to solve the problems involved, disasters because of fires are of not infrequent occurrence. It is the purpose of the present invention to provide a novel and improved fuel supply means which not only tends to minimize the possibility of breakage of a fuel supply line but also eliminates the possibility of dangerous leakage even when breakage occurs. The fuel line which comprises the subject matter of the present invention includes three concentrically disposed tubular members, the inner and outer tubes being of ductile metal and the intermediate tube being of spongy or resilient material, rubber or a synthetic rubber-like material being preferred. The three tubular members are coextensive in length and the two metallic tubes closely engage the inner and outer surfaces of the intermediate resilient tube which intermediate tube acts as a cushion, absorbing and damping the vibrations of the innermost tube and thus prolonging its useful life.

The intermediate tube of resilient material is longitudinally grooved or otherwise apertured to receive and maintain a body of gas under pressure. Means is provided for maintaining in the space thus set aside a body of non-combustible gas under a pressure which is higher than the pressure obtaining within the innermost tube, that is, the gaseous body between the inner and outermost tubes is under a pressure superior to that of the pressure of the gasoline or other fuel within the inner tube. Hence, should a crack or break occur in the inner tube, and such crack or break be continued through the intermediate tube to a recess containing non-combustible gas under pressure, the gas will then pass inwardly into the inner tube and the liquid fuel will not pass outwardly into the gas recess. When this occurs the operator will soon realize that the fuel line is broken, as the non-combustible gas will be passing to the carbureting device of the engine, and will take appropriate steps. It is preferred, however, to provide auxiliary means for indicating at once that the fuel line has been broken or cracked or, alternatively, to provide a valve in association with the fuel line which will close the inner tube or conduit immediately upon breaking or cracking thereof.

The invention is susceptible of being embodied in numerous forms in adapting the same to fuel supply systems which vary in constructional details and for the purpose of disclosure one embodiment is illustrated in the accompanying drawing.

In the drawing:

Figure 1 is a diagrammatic view of an entire fuel supply means in which the invention is incorporated;

Figure 2 is a view of portion of the mechanism shown in Figure 1 upon a larger scale and partially broken away, the automatic valve interposed in the fuel line being shown in section;

Figure 3 is a section taken on line 3—3 of Figure 2, upon a somewhat larger scale;

Figure 4 is a perspective view of one end of the fuel line, the outer tubular member being broken away to show the intermediate member more clearly;

Figure 5 is a view which illustrates a preferred step in the process of assembly of the three concentric tubes of the fuel line; and Figures 6 and 7 are half longitudinal sectional views illustrating the method of providing the end sealing connections of the jacketed conduit.

In Figure 1 of the drawing a gasoline supply tank is diagrammatically indicated at 10, a carbureting device at 11, a fuel pump at 12, a flask or receptacle for a gas under pressure at 13 and a portion of an instrument panel at 14, an indicating device 15 being shown to be mounted upon the panel 14. The distance between the fuel tank 10 and the carbureting device may vary greatly, being relatively short in some instances and relatively long in others. In the fuel supply means illustrated three sections of the novel and improved fuel line are made use of, these sections being indicated at a, b and c. Each section includes an inner tubular member 16 of ductile metal, an outer tubular member 17 of preferably the same material, such as copper, and an intermediate tubular member 18 of resilient rubber-like material, either natural or synthetic rubber or rubber-like substance, preferably a substance which resists attack of hydrocarbon products such as gasolines and lubricating oils while at the same time is sufficiently resilient to comprise a cushioning means for cushioning or damping out vibrations of the inner tube 16 relatively to the outer tube 17.

This fuel line comprises a single integral bendable tubular member for the purpose of assembly in an airplane or motor vehicle and may be bent around curves without injury. In fabricating the fuel line the resilient cushion-like member 18 is first assembled upon the outer surface of the inner tube 16 and this may be done, and preferably is done, by an extrusion process so that the inner surface of the intermediate tubular member 18 intimately engages the outer surface of the inner tube 16. Formed exteriorly in the intermediate tubular member 18 are a series of longitudinal grooves 19 which comprise recesses for the reception and maintenance of bodies of gas under pressure, in the operation of the fuel supply system. The grooves 19 may well be formed in the tubular member at the time of extrusion. Following the formation of the inner and intermediate tubes the outer tube 17 is applied and this is first applied loosely, i. e., with a clearance between the outer surface of the intermediate member 18 and the inner surface of the outer tube 17. After having been placed over the intermediate tube the outer tube is contracted so that its inner surface very closely engages the outer surface of the intermediate tube. This contraction may conveniently be effected by a drawing operation, the three concentrically arranged tubes being drawn through a die such as indicated at 20 in Figure 5. This drawing operation contracts the outer tube diametrically, the outer tube being ductile, and brings the outer and intermediate tubes into the desired stated relationship. The fuel or oil line thus formed is then ready for use and may be severed into lengths for the purpose of connecting the various essential elements of the fuel supply system.

The portion a of the fuel line, shown in Figure 1, extends from the fuel tank to a point adjacent a valve housing 22. The portion b extends from the valve housing 22 to the pump 12 and portion c from the pump 12 to the carburetor 11. The ends of the recesses 19 of each of these sections are closed by suitable closure means, as by fittings 23, so that gas introduced into the various recesses cannot escape at the ends of the sections a, b, and c. In Figures 6 and 7 the details of the fittings 23 are more clearly illustrated. In making these connections, the inner tube 16 is severed at the proper point, as shown in Figures 6, the outer tube 17 is cut at a point considerably short of the point of severance of the inner tube, and by means of a special tool the grooved rubber-like intermediate member 18 is reamed out for a further distance inwardly of the end of the outer tube 17. The outer tubing clamp nut 45 is placed around the end of the jacketed conduit and, by means of certain known instrumentalities, the outer tube 17 is flared as at 46 to fit the inner contour of the nut. Then the inner tubing clamp nut 48 is threaded within the outer nut 45, and, when tightened, securely clamps the flared end of tube 17. The projecting end of the inner tube 16 is then flared outwardly as at 49 against the inclined surface of the nut 48; and finally, the connecting or coupling fitting 50 is threaded within the nut 48 and serves to securely clamp the end of the tube 16. The other end of this connecting fitting 50 is threaded into one of the T-couplings 51 as shown in Figure 2 of the drawing. Gas, such as carbon dioxide under pressure, flows from the flask 13 through conduit 24, when the valve 24' is opened, to a sleeve-like fitting 25 encircling the fuel line b, the interior of the fitting 25 being in communication, through suitable apertures formed in the outer tube 17 of line b, with all of the grooves 19. The pressure in these grooves will be maintained above that in the fuel line by admitting gas to the proper degree of pressure through the valve 24'. Fitting 25 is connected by a duct 26 with a fitting 27 encircling the fuel line section a so that the grooves 19 of section a are likewise filled with gas under pressure.

By means of a by-pass 28, connecting fitting 29 encircling conduit b and fitting 30, encircling conduit c, the gas under pressure existing within the channels 19 of conduit b is communicated to the corresponding channels of conduit c, around the fuel pump 12. It will thus be seen that, by the provision of the gas conduits mentioned, the recesses 19 of all three sections a, b, and c of the fuel line are supplied with gas under pressure from a single source and, by the proper actuation of valve 24 or by making use of any suitable gas pressure regulating means (not illustrated) the pressure within the fuel supply main may be maintained at any predetermined value. This pressure may vary considerably but in every instance should be greater than the pressure of the liquid fuel within the fuel supply line.

It will be appreciated that, should the inner tube 16 become broken due to crystallization or excessive vibration, or even cracked, and communication is established by a further rupture of the intermediate tubular member 18 between one or more of the gas channels 19 and the interior of tube 16, the gas will force its way into the tube 16 and will not permit the flow of fuel outwardly. The presence of gas in the fuel line will naturally interfere with the operation of the pump 12 and carbureting device 11 and hence interfere with the operation of the engine being supplied with fuel. This in itself will indicate to the operator that the fuel line is broken and will cause him to take appropriate steps. Nevertheless it is desirable to provide means which more immediately indicates to the operator that such breakage has occurred and, if desired, to provide automatic means for instantly interrupting the flow of fuel upon breakage or cracking of the inner tube 16.

In Figure 1 an indicator 15 is shown to be mounted upon the instrument panel 14 and connected to the by-pass duct 26 by means of a conduit 33. Also connected to by-pass duct 26, by conduit 34, is a chamber 35 above a diaphragm 36 of flexible nature the edges of which are clamped between the upper and lower parts of the diaphragm chamber generally indicated at 37. The valve housing 22 has a downwardly facing annular valve seat 38 against which the vertically movable valve 39 may seat. The stem 40 of valve 39 is connected to the diaphragm 36. A spring 41 normally urges the valve toward closed position but the valve is normally maintained in its open position by gas pressure in the chamber 35 above diaphragm 36, this pressure being sufficiently great to deflect diaphragm 36 downwardly against the resistance of spring 41. The valve 39 remains open so long as the gas pressure in the system remains at or above a predetermined amount, but if either the outer or the inner metallic tube 16 or 17 should rupture or break, the gas will leak out of the jacket and, the valve 24' being closed, the reduced pressure in the system will permit the spring 41 to close the valve 39. The indicator 15 will then immediately respond to the reduction in pressure and inform the pilot of the break in the fuel line. The operator may, however, in the case of necessity, open the manually operable valve 42 controlling flow of fuel through by-pass 43, thus re-establishing the flow of motive fuel to the carbureting device despite the leakage which has already been indicated by the mechanism described. The operator, however, has been fully informed of the break in the fuel line and will of course take such steps as he can, immediately, to prevent the occurrence of a fire and to guide his craft as quickly as possible to a point where adequate repairs may be made.

Various changes and modifications may be made in the embodiment illustrated and described herein without departing from the scope of the invention as defined by the following claims.

Having thus described the invention, what is claimed as new and desired to be secured by Letters Patent is:

1. In a fuel supply means for power plants, in combination, a fuel tank, a carbureting device, and a fuel line leading from said tank to said device, said fuel line comprising a fuel conducting tube, means for maintaining around said tube a gas under pressure greater than the pressure of the liquid within the tube, and means also subjected to the pressure of said gas for automatically closing said tube when the gas pressure in said means falls.

2. In a fuel supply means for power plants, in combination, a fuel tank, a carbureting device, and a fuel line leading from said tank to said device, said fuel line comprising a liquid fuel conducting tube, a valve for closing said tube, a chamber for a gas under pressure without the tube, and means for effecting closure of said valve when the pressure of the gas in said chamber falls below a predetermined amount.

3. The combination set forth in claim 2 in which a by-pass is provided for conducting liquid fuel around the said valve when closed, flow through said by-pass being controlled by a manually operable valve.

4. In a fuel supply means for power plants, in combination, a fuel tank, a carbureting device, and a fuel line leading from said tank to said device, said fuel line comprising a liquid fuel conducting tube, a valve for closing said tube, a chamber for a gas under pressure enveloping the tube, and a movably mounted element subjected at all times to the pressure of the gas in said chamber, said valve being operatively connected to said element and being moved thereby to closed position when the gas pressure falls below a predetermined amount.

JOHN HART WILSON.